United States Patent [19]
Stover
[11] 3,757,226
[45] Sept. 4, 1973

[54] DIGITAL MEANS FOR IMPROVING THE SIGNAL TO NOISE RATIO OF REPETITIVE MORSE CODE-TYPE SIGNALS

[75] Inventor: Harris A. Stover, Cedar Rapids, Iowa
[73] Assignee: Collins Radio Company, Cedar Rapids, Iowa

[22] Filed: Jan. 17, 1972
[21] Appl. No.: 218,279

[52] U.S. Cl. .................... 325/323, 178/88, 325/473
[51] Int. Cl. .................... H03k 5/18
[58] Field of Search .................... 178/88; 325/323, 325/473

[56] References Cited
UNITED STATES PATENTS
3,670,251 6/1972 Shintani et al. .................... 178/88 X
OTHER PUBLICATIONS
Phister, M. Logical Design of Digital Computers. N.Y., J. Wiley & Sons, 1963. p 116.

*Primary Examiner*—Felix D. Gruber
*Assistant Examiner*—R. Stephen Dildine, Jr.
*Attorney*—Richard W. Anderson et al.

[57] ABSTRACT
A digitally implemented means for enhancing the reception of repetitive binary code transmission sequences is based on a statistical approach of comparing a sampled level of the incoming code at any instant with that received and stored at the time occurrence of the corresponding point on a previously received code sequence. The sampled levels are applied to logic circuitry which modifies stored samples in a plurality of shift registers subject to certain logical constraints. After a sufficient number of input level samples, a substantially noise free replica of the incoming code circulates in the most significant bit one of the plurality of shift registers each of which stores and circulates a progressively more significant bit of a multi-bit stored binary number. Either the input to, or output from, the most significant bit shift register comprises the system output.

11 Claims, 1 Drawing Figure

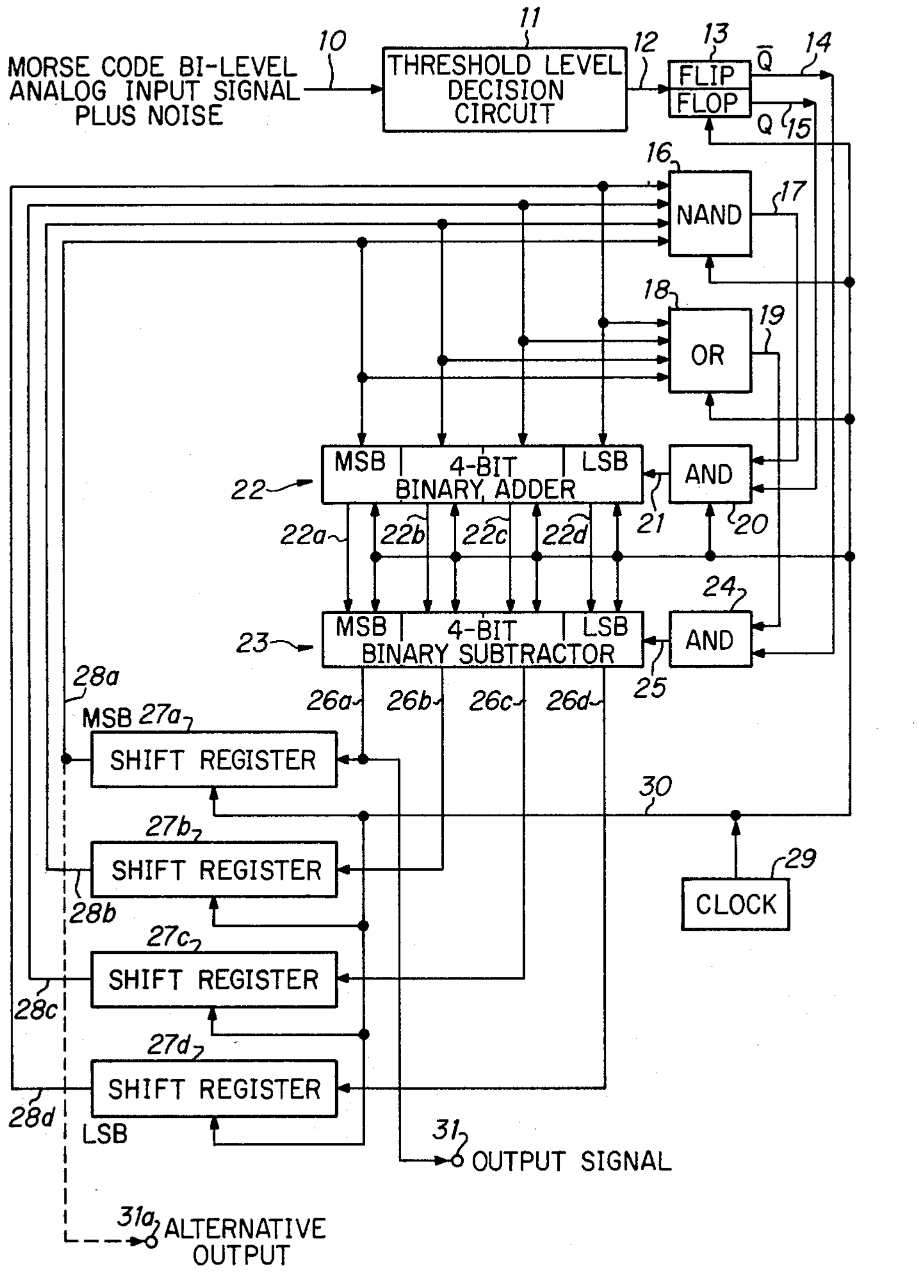
MORSE CODE BI-LEVEL ANALOG INPUT SIGNAL PLUS NOISE
10
11
THRESHOLD LEVEL DECISION CIRCUIT
12
13
FLIP FLOP
Q̄
14
Q
15
16
NAND
17
18
OR
19
MSB
4-BIT BINARY ADDER
LSB
AND
22
21
20
22a
22b
22c
22d
24
MSB
4-BIT BINARY SUBTRACTOR
LSB
AND
23
25
28a
MSB
27a
26a
26b
26c
26d
SHIFT REGISTER
30
27b
SHIFT REGISTER
28b
29
CLOCK
27c
SHIFT REGISTER
28c
27d
SHIFT REGISTER
28d
LSB
31
OUTPUT SIGNAL
31a
ALTERNATIVE OUTPUT

DIGITAL MEANS FOR IMPROVING THE SIGNAL TO NOISE RATIO OF REPETITIVE MORSE CODE-TYPE SIGNALS

This invention relates generally to the improvement of signal to noise ratio in radio receivers and more particularly to the improvement of signal to noise ratio in receivers which recover repetitively modulated Morse code identification signals.

Numerous radio receiving equipments demodulate transmissions which include Morse code periodic identification signals. For example, automatic direction finding receivers include means for demodulating repetitive More code modulation sequences as well as other navigational receivers operating with ground transponder or beacon stations wherein the station identification is carried as a periodic repetitive Morse code modulation of the transmitted carrier.

While synchronous demodulation techniques in the present state of the art have enhanced the ability of various navigation receivers to perform their navigational function such as, for example, determination of bearing to a ground transmitting station in the case of automatic direction finders, the useful range over which these equipments may be utilized is limited by the extent to which a particular ground station to which a direction indication is developed may be identified.

In my co-pending application, Ser. No. 218,194, filed Jan. 17, 1972, entitled "Means For Extending Identification Range Of Radio Equipments Using Repetitive Coded Identification Signals," and assigned to the assignee of the present invention, there is described a means for enhancing the capability for a receiver to recover modulated intelligence in the presence of extreme noise. Means are described wherein repetitive code transmissions are operated on by an integrative or coherent signal improving process by means of which the received coded signal adds coherently during each reception period to that received during a previous transmission sequence, while noise accompanying the received codes adds incoherently. The result is an improved signal which is "pulled up" out of the noise level after a predetermined number of coded transmission reception sequences.

The present invention has as a primary object thereof a digital means for improving the signal to noise ratio of repetitive bilevel identification code transmissions such as Morse code. While the present invention basically operates to improve the signal to noise ratio as concerns the reception of repetitive Morse code identification signals and differs from that described in the above referenced co-pending application in the method employed, due to the binary nature of Morse signals, that is, on-off or plus-minus, a considerably simpler but still very effective signal enhancement approach on a digital basis may be provided for Morse code signals.

The present invention is featured generally in employment of a threshold level sensitive decision circuit providing a binary output according to the level of the received Morse code signal. Since the output of this decision circuit may be frequently in error because of noise pollution on the analog Morse code input signal, digital logic and arithmetic circuitry is employed in conjunction with the decision circuit to overcome the effects of the errors in the output of the decision circuit. The received input signal is employed to modify signals corresponding to previous reception intervals stored in shift registers. The modification is subject to certain unique constraints, and after a predetermined number of reception intervals of the repetitive Morse code transmission, a substantially noise-free replica of the received code is developed.

Accordingly, another general object of the present invention is the provision of digital circuitry permitting reception and intelligent demodulation of a repetitive and noisy analog Morse code signal.

These and other features and objects of the present invention will become apparent upon reading the following description with reference to the accompanying drawing in which the single FIGURE is a functional block diagram of a particular embodiment of a signal enhancement means in accordance with the present invention.

The digital signal enchancement arrangement defined in the above referenced co-pending application utilizes fractional negative feedback approaches and both analog and digital implementations are discussed. By way of contradistinction, the present invention utilizes the input signal to modify signals stored in shift registers subject to certain restraints which serve to make the approach very effective and uniquely adaptive to two-level signals of the type employed for Morse code. Since Morse code signals are binary in nature, a simple threshold sensitive decision circuit may be employed instead of the more elaborate analog to digital converter means described in the above referenced co-pending application. As a result of this decision, a binary "one" is either added or subtracted from the previously stored information for the corresponding point on the identification code, subject to the constraints that a "one" cannot be added if it will cause the result to exceed a predetermined value, and a "one" cannot be subtracted if it would cause the result to go below a predetermined value. The result of this will be a definite statistical tendency for the stored signal for each sampled point (code element) of the identification signal to approach one or the other of the two predetermined values. After a sufficient number of cycles of the identification signals, a replica of the identification signal will be stored in one of a plurality of shift registers which contains the most significant bit. The contents of this shift register will be disturbed but very little by the decision circuit errors resulting from noise on the incoming signal. The ensuing discussion will bear this out.

With reference to the figure, the analog input signal 10, which may consist of Morse code plus noise is continually supplied to a threshold level decision circuit 11. Decision circuit 11 continually selects or provides either of two output states on output 12 depending upon whether the input signal 10 does or does not exceed a predetermined threshold value. The output of decision circuit 11 may be frequently in error because of noise on the analog input signal 10. The remainder of the digital circuitry in the figure is, therefore, employed in accordance with the present invention to overcome the effects of the errors in the output 12 of decision circuit 11. The output 12 from decision circuit 11 is applied to a flip-flop circuit 13. Flip-flop 13 additionally receives an input 30 from a system clock 29 which provides timing pulses 30 for the entire system. Thus, flip-flop 13, for each period of clock 29, has its state determined by the output state of decision circuit 11. Thus, for each clock period, one of the outputs 15 from flip-flop 13 (identified as the Q output) is driven to a binary level corresponding to that of the output of decision circuit 11 and supplied as a first input to an AND gate 20. The other output 14 from flip-flop 13 (identified as the $\overline{Q}$ output) is applied as a first input to a further AND gate 24.

In the illustrated embodiment a 4-bit binary adder 22 provides successive significant bit outputs 22*a*–22*d* as inputs to a 4-bit binary subtractor 23. The output 21 from AND gate 20 is applied to the least significant bit section of binary adder 22 while the output 25 of AND gate 24 is applied to the least significant bit section of 4-bit binary subtractor 23. The paralleled outputs 26*a*–26*d* from binary subtractor 23 are applied as respective inputs to successive ones of four shift registers, 27*a*–27*d*. The outputs 28*a*–28*d* from the respective shift registers 27*a*–27*d* are applied as paralleled inputs to respective sections of binary adder 22. The output 28*a* from the most significant bit (MSB) shift register 27*a* is applied as an input to the most significant bit section of binary adder 22, etc. The paralleled outputs 28*a*–28*d* from the respective shift registers 27*a*–27*d* are also applied as respective paralleled inputs to a NAND gate 16 and as paralleled inputs to an OR gate 18. The output 17 from NAND gate 16 is applied as the second input to AND gate 20 while the output 19 from OR gate 18 is applied as the second input to AND gate 24, the latter AND gates providing the inputs 21 and 25 to the least significant bit sections of binary adder 22 and binary subtractor 23, respectively. NAND gate 16 and OR gate 18 have applied as timing inputs the output 30 from system clock 29. The output 26*a* from the most significant bit section of binary subtractor 23 is applied to an output terminal 31. Alternatively, the output from the most significant bit shift register 27*a* may comprise the system output (designated 31*a*). As will be further described, the output 31 (or 31*a*) comprises an enhanced Morse code identification signal devoid of noise.

In operation, for each clock period of clock 29, which determines the timing for the entire system, flip-flop 13 has its output state determined by the output state of decision circuit 11. The Q output 15 of flip-flop 13 follows that of the output state of decision circuit 11. For each clock period, one of the outputs 14 and 15 of flip-flop 13 is a binary "one" and the other output is a binary "zero." As previously described, the Q output 15 of flip-flop 13 is applied to AND gate 20 and the other $\overline{Q}$ output 14 of flip-flop 13 is applied to AND gate 24. If the other input 17 to AND circuit 20 is a binary "one," and the Q output 15 of flip-flop 13 is a binary "one," a binary "one" output from AND circuit 20 is applied on line 21 as addend to the least significant bit of binary adder 22. Similarly, if the other input 19 to AND circuit 24 is a binary "one," a binary "one" output from AND circuit 24 is a binary "one", and the $\overline{Q}$ output 14 of flip-flop 101 is fed as subtrahend to the least significant bit of binary subtractor 23. Shift registers 27*a*–27*d* then each serve to store and delay one significant bit of the output (the remainder) of binary subtractor 23. The outputs 28*a*–28*d* of shift registers 27*a*–27*d* supply the input to the augend of binary adder 22. The output (the sum) of binary adder 22 supplies the input to the minuend of binary subtractor 23. Clock 29 supplies output timing pulses 30 for the entire system.

Thus, if the outputs of AND circuit 20 and AND circuit 24 are both "zero" for an extended period of time, the same sequence of numbers will continue to circulate through the system. This sequence of numbers can only be altered by adding or subtracting one least significant bit at a time defined by "one" outputs from AND gates 20 or 24, respectively.

If the outputs of NAND gate 16 and OR gate 18 are both "one," a "one" will either be added or subtracted to the least significant bit of the previously stored number for each bit period depending upon the state of flip-flop 13. However, if the previously stored number should be all "ones," NAND gate 16 will have a zero output and will inhibit (in AND gate 20) the addition of another least significant bit which would change the stored bits to all "zeros." The only way the stored number can then reach all zeros is by the subtraction of one least significant bit at a time by the output 19 from OR gate 18 as applied to enable AND gate 24. Similarly, if the previously stored number should be all zeros, OR gate 18 will provide a zero output on line 19 and will inhibit the subtraction of another least significant bit which would change the stored number all to ones. The only way, therefore, that the stored number can reach all ones is by the addition of one least significant bit at a time.

The length of shift registers 27*a*–27*d* and the clock rate of clock 29 would then be selected such that the output of the shift registers corresponds to the same point on the identification codes as that currently being sampled by decision circuit 11. With the selected clock rate, the identification code is then actually stored within the length of the shift registers 27*a*–27*d* and circulates through the shift registers in a manner similar to the analog recorder technique described in the above referenced co-pending application. In a noise free case, each of the shift registers 27*a*–27*d* will then contain the identification code. In the case of a noisy input, the least significant bit shift register 27*d* will contain the most noise (error) and the error will be progressively less in successively more significant bit ones of the shift registers. The most significant shift register 27*a*, associated with the most significant bit of the adder/subtractor will then contain the most noise free replica of the identification signal because it requires the most repetitions of each point on the identification code in order to change state. When the signal 10 applied to the system is high, "one" will occur more frequently than "zero" and be much more likely to occur in the shift register. When the signal is low, "zero" will occur more frequently than "one" and be more likely to occur in the shift register.

It is apparent then, that the number of bits included in the binary adder and binary subtractor is directly proportional to the accuracy of the system as concerns generation of the received code replica, and the number of bits in turn defines the number of shift registers employed. In the illustrated embodiment, an accuracy to four bits is realized, thus determining that four shift registers are employed. In general, the more accuracy (the larger the number of bits in the adder and subtractor) to which the system is adapted, the longer the period of time required to develop the noise free replica in the most significant bit shift register, and the less noise appearing at the output.

To illustrate the manner in which the plurality of shift registers store the received code with the replica accuracy increasing in shift registers associated with the more significant bits may be illustrated by reference to Table I. Table I was prepared by assuming that the desired signal was at a particular point on the identification signal where the signal should be a "one" but the desired signal was corrupted by noise so that a significant portion of the decisions made by decision circuit 11 were in error ("zero" decisions). In order to select random error decisions, Table I was prepared from flipping a coin twice for each decision and inserting in the table a "zero" (error decision) whenever the coin exhibited two heads in a row. Table I illustrates a starting count in binary subtractor 23 as being all "zeros" (assumption) and 52 consecutive random output states from binary subtractor 23 determined by noise corruption on a random basis, as above defined.

TABLE I

| Decision No. | Decision Circuit Output | Binary Subtractor Output States MSB | | | LSB |
|---|---|---|---|---|---|
| (Start count) | | 0 | 0 | 0 | 0 |
| 1. | 1 | 0 | 0 | 0 | 1 |
| 2. | 1 | 0 | 0 | 1 | 0 |
| 3. | 1 | 0 | 0 | 1 | 1 |
| 4. | 0 | 0 | 0 | 1 | 0 |
| 5. | 1 | 0 | 0 | 1 | 1 |
| 6. | 0 | 0 | 0 | 1 | 0 |
| 7. | 1 | 0 | 0 | 1 | 1 |
| 8. | 1 | 0 | 1 | 0 | 0 |
| 9. | 0 | 0 | 0 | 1 | 1 |
| 10. | 1 | 0 | 1 | 0 | 0 |
| 11. | 1 | 0 | 1 | 0 | 1 |
| 12. | 0 | 0 | 1 | 0 | 0 |
| 13. | 0 | 0 | 0 | 1 | 1 |
| 14. | 1 | 0 | 1 | 0 | 0 |
| 15. | 1 | 0 | 1 | 0 | 1 |
| 16. | 1 | 0 | 1 | 1 | 0 |
| 17. | 1 | 0 | 1 | 1 | 1 |
| 18. | 1 | 1 | 0 | 0 | 0 |
| 19. | 0 | 0 | 1 | 1 | 1 |
| 20. | 1 | 1 | 0 | 0 | 0 |
| 21. | 1 | 1 | 0 | 0 | 1 |
| 22. | 1 | 1 | 0 | 1 | 0 |
| 23. | 1 | 1 | 0 | 1 | 1 |
| 24. | 0 | 1 | 0 | 1 | 0 |
| 25. | 1 | 1 | 0 | 1 | 1 |
| 26. | 1 | 1 | 1 | 0 | 0 |
| 27. | 0 | 1 | 0 | 1 | 1 |
| 28. | 1 | 1 | 1 | 0 | 0 |
| 29. | 1 | 1 | 1 | 0 | 1 |
| 30. | 1 | 1 | 1 | 1 | 0 |
| 31. | 1 | 1 | 1 | 1 | 1 |
| 32. | 1 | 1 | 1 | 1 | 1 |
| 33. | 1 | 1 | 1 | 1 | 1 |
| 34. | 1 | 1 | 1 | 1 | 1 |
| 35. | 1 | 1 | 1 | 1 | 1 |
| 36. | 0 | 1 | 1 | 1 | 0 |
| 37. | 1 | 1 | 1 | 1 | 1 |
| 38. | 1 | 1 | 1 | 1 | 1 |
| 39. | 0 | 1 | 1 | 1 | 0 |
| 40. | 1 | 1 | 1 | 1 | 1 |
| 41. | 1 | 1 | 1 | 1 | 1 |
| 42. | 1 | 1 | 1 | 1 | 1 |
| 43. | 1 | 1 | 1 | 1 | 1 |
| 44. | 1 | 1 | 1 | 1 | 1 |
| 45. | 0 | 1 | 1 | 1 | 0 |
| 46. | 1 | 1 | 1 | 1 | 1 |
| 47. | 0 | 1 | 1 | 1 | 0 |
| 48. | 1 | 1 | 1 | 1 | 1 |
| 49. | 1 | 1 | 1 | 1 | 1 |
| 50. | 1 | 1 | 1 | 1 | 1 |
| 51. | 0 | 1 | 1 | 1 | 0 |
| 52. | 1 | 1 | 1 | 1 | 1 |

The corresponding output states of the binary subtractor 23 are illustrated, each desired "one" signal being a "zero" for random noise corruptions. It is to be emphasized that Table I was prepared with the assumption that the desired signal was at a particular point on the identification signal where the signal should be a "one" and thus Table I represents a "look" at a particular bit of sequential coded transmission sequences.

The count existing in the binary subtractor 23, in response to the random binary outputs from decision circuit 11, responds as indicated in Table I due to the aforedescribed logic circuitry count inhibiting functions. The significant thing to note from Table I is that, although the left-hand column of the count, corresponding to the most significant bit (MSB) output of binary subtractor 23 (and which is the output utilized as system output), takes a finite time to build up to the correct value (in this instance an assumed "one" value), the count becomes extremely stable once it reaches that value. Table I illustrates that the count in the most significant bit portion of binary subtractor 23 becomes a stable "one" after twenty decisions are applied from decision circuitry 11. The three right-hand columns, representing the successively lesser significant bit outputs from binary subtractor 23 exhibit successively lesser degrees of stabilization and although the count outputs from the lesser significant bit sections exhibit considerable jittering from binary "one" to binary "zero," they are ineffective in destabilizing the output from the most significant bit section of the subtractor. The only thing required to assure that the left-hand column (the most significant bit output) will reach the correct value is that the correct decisions by decision circuitry 11 outnumber the incorrect decisions. Since this type of evaluation is sequentially carried out for each point in the received identification code, and the results are circulated in the shift registers, corruptions. nearly noise free replica of the identification code is seen to be reproduced in the shift register containing the most significant bit. It might be emphasized here that the tabulation of Table I would show a similar result if a desired "zero" signal was assumed and that the "one" decisions by decision circuit 11 represented noise corruptuins. In this case, the "ones" and "zeros" representing the output from the binary subtractor as applied to the associated shift registers would be reversed in the Table.

The system has been described using four bit binary adders and subtractors and four shift registers, one circulating each particular significant bit output from the binary subtractor. Using more digits in the binary adders and subtractors and the additional shift registers required, while requiring more successive decision inputs to arrive at stability in the most significant bit output of the binary subtractor, would provide a proportionally increased accuracy as concerns the replica of the incoming code generated by the most significant bit output of the subtractor and circulated in the most significant bit shift register.

To consider the question of how long the shift registers would be for Morse code identification input signals, considerable system flexibility is permitted. The basic time element in Morse code is the dot and the Morse code dash is three times as long as the dot with the space between letters also being three times as long as the dot. The letters *j*, *q*, and *y* are the longest letters in the International Morse Code alphabet, each consisting of one dot, three dashes, three spaces between these elements, and one space before the next letter. Thus, the longest letters in the Morse code alphabet require a total of 16 code elements. Assuming an identification code to consist of four of these longest letters, the code would be 64 code elements long. Further, the average Morse code letter is usually taken as being nine code elements long, so the 64 code elements would allow for seven average length identification letters. If then it were assumed that in a given system it was desired to sample each received code element three times, by judicious choice of the clock repetition rate for the system as compared to the repetition rate of the incoming code, a total shift register length of three times 64 or 192 bits would be required. Since the shift registers require no parallel inputs or outputs, shift registers of 192 bits length are quite practical for current MOS technology. It is to be emphasized that the speed with which the receiving system operates is controlled by clock 29. Since it is not necessary to take exactly three decisions per code element but only to make the entire cycle time of the shift registers employed equal to the identification code period or some multiple thereof, considerable flexibility of the system may be obtained by adjusting the frequency of clock oscillator 29 to correspond to the desired identification period.

The present invention thus provides a method of enhancing the reception of repetitive Morse code identification signals in a relatively simple manner. The system is binary in nature and requires no mechanical moving parts. The components for implementing the system are readily available. Although the input to the most significant bit shift register has been indicated as the output of the system, the output of the most significant bit shift register might alternatively serve as the system output signal, since the incoming code is continuously circulated through each of the shift registers.

Thus, although the present invention has been described with respect to a particular embodiment thereof, it is not to be so limited as changes might be made therein which fall within the scope of the invention as defined in the appended claims.

I claim:

1. Signal processing means for generating a relatively noise free replica of a cyclic repetitive binary code sequence comprising threshold sensitive means for converting said code to first and second predetermined binary levels in response to elements of said code respectively exceeding or being less than a predetermined magnitude, a flip-flop circuitry having first and second complementary outputs, means for controlling said first output of said flip-flop circuitry at a predetermined clock sampling rate in accordance with the output level of said threshold sensitive means, a multi-bit binary adder including a least significant bit section and a most significant bit section, a multi-bit binary subtractor including a least significant bit section and a most significant bit section, the outputs of said binary adder section being applied to like significant bit sections of said binary subtractor, a plurality of shift registers each receiving as a serial input thereto the output from an associated one of said binary subtractor sections, the output of each of said shift registers being applied as input to respective like significant bit sections of said binary adder, means for timing said shift register and said binary adder and subtractor at said clock rate, means responsive to said first flip-flop output for adding a binary "one" to the count in said binary adder in response to the repetitive outputs from said plurality of shift registers collectively exhibiting a permutation of binary levels other than all said first binary levels and with said first flip-flop output exhibiting said first binary level, means responsive to said flip-flop second output for subtracting a binary "one" from the count in said binary subtractor in response to the respective outputs of said shift registers collectively exhibiting a permutation of binary levels other than all said second binary levels and with said second flip-flop output exhibiting said first binary level, and an output signal comprising the binary signal circulating through a selected one of said plurality of shift registers.

2. Signal processing means as defined in claim 1 wherein said output signal comprises the binary signal circulating through the most significant bit one of said plurality of shift registers.

3. Signal processing means as defined in claim 2 wherein said clock rate is selected such that the output of said shift registers corresponds to the same point on said received code as that currently being sampled by flip-flop circuitry.

4. Signal processing means as defined in claim 3 wherein said clock rate effects a single sampling of successive elements of said input code during each element reception period.

5. Signal processing means as defined in claim 3 wherein said clock rate effects a multiple sampling of successive elements of said input code during each element reception period.

6. Signal processing means as defined in claim 1 wherein said means for adding comprises a NAND gate receiving the outputs of each of said shift registers, a first AND gate receiving the output of said NAND gate and said first output from said flip-flop as respective inputs thereto, the output from said first AND gate being applied to the least significant bit section of said binary adder; said means for subtracting comprising an OR gate receiving the outputs from each of said shift registers, a second AND gate receiving the output of said OR gate and said second output from said flip-flop as respective inputs thereto, and the output from said second AND gate being applied to the least significant bit section of said binary subtractor.

7. Signal processing means as defined in claim 6 wherein said clock rate is selected such that the output of said shift registers corresponds to the same point on said received code as that currently being sampled by flip-flop circuitry.

8. Signal processing means for generating a relatively noise free replica of a cyclic repetitive binary code sequence comprising threshold sensitive means for converting said code to first and second predetermined binary levels in response to elements of said code respectively exceeding or being less than a predetermined magnitude, a flip-flop circuitry having first and second complementary outputs, means for controlling said first output state of said flip-flop circuitry at a predetermined clock sampling rate in accordance with the output level of said threshold sensitive means, a multi-bit binary adder including a least significant bit section and a most significant bit section, a multi-bit binary subtractor including a least significant bit section and a most significant bit section, the outputs of said binary adder section being applied to like significant bit sections of said binary subtractor, a plurality of shift registers each receiving as a serial input thereto the output from an associated one of said binary subtractor sections, the output of each of said shift registers being applied as input to respective like significant bit sections of said binary adder, means for timing said shift register and said binary adder and subtractor at said clock rate, means responsive to said first flip-flop output for adding at the time of a current sample of said input signal one least significant bit to the count stored in said binary adder at the conclusion of a next preceding input signal sample, said means for adding being enabled by said first flip-flop output exhibiting said first binary level, means responsive to said second flip-flop output for subtracting at the time of a current sample of said input signal one least significant bit from the count stored in said binary subtractor at the conclusion of a next preceding input signal sample, said means for subtracting being enabled by said second flip-flop output exhibiting said first binary level, means for inhibiting said means for adding when the respective outputs of said shift registers collectively exhibit a permutation of all said first binary levels, means for inhibiting said means for subtracting when the outputs of said shift registers collectively exhibit a permutation of all said second binary levels, and an output signal comprising the binary signal circulating through a selected one of said plurality of shift registers.

9. Signal processing means as defined in claim 8 wherein said output signal comprises the binary signal circulating through the most significant bit one of said plurality of shift registers.

10. Signal processing means for generating a relatively noise free replica of a cyclic repetitive binary code sequence comprising threshold sensitive means for converting said code to first and second predetermined binary levels in response to elements of said code respectively exceeding or being less than a predetermined magnitude, a flip-flop circuitry having first and second complementary outputs, means for controlling said first output of said flip-flop circuitry at a predetermined clock sampling rate in accordance with the output level of said threshold sensitive means, a multi-bit binary adder including a least significant bit section and a most significant bit section, a multi-bit binary subtractor including a least significant bit section and a most significant bit section, the outputs of said binary adder section being applied to like significant bit sections of said binary subtractor, a plurality of shift registers each receiving as a serial input thereto the output from an associated one of said binary subtractor sections, the output of each of said shift registers being applied as input to respective like significant bit sections of said binary adder, means for timing said shift register and said binary adder and subtractor at said clock rate, a NAND gate receiving the outputs of each of said shift registers, a first AND gate receiving the output of said NAND gate and said first output from said flip-flop as respective inputs thereto, the output from said first AND gate being applied to the least significant bit section of said binary adder; an OR gate receiving the outputs from each of said shift registers, a second AND gate receiving the output of said OR gate and said second output from said flip-flop as respective inputs thereto, the output from said second AND gate being applied to the least significant bit section of said binary subtractor, and an output signal comprising the binary signal circulating through a selected one of said plurality of shift registers.

11. Signal processing means as defined in claim 10 wherein said output signal comprises the binary signal circulating through the most significant bit one of said plurality of shift registers.

* * * * *